Patented Oct. 25, 1927.

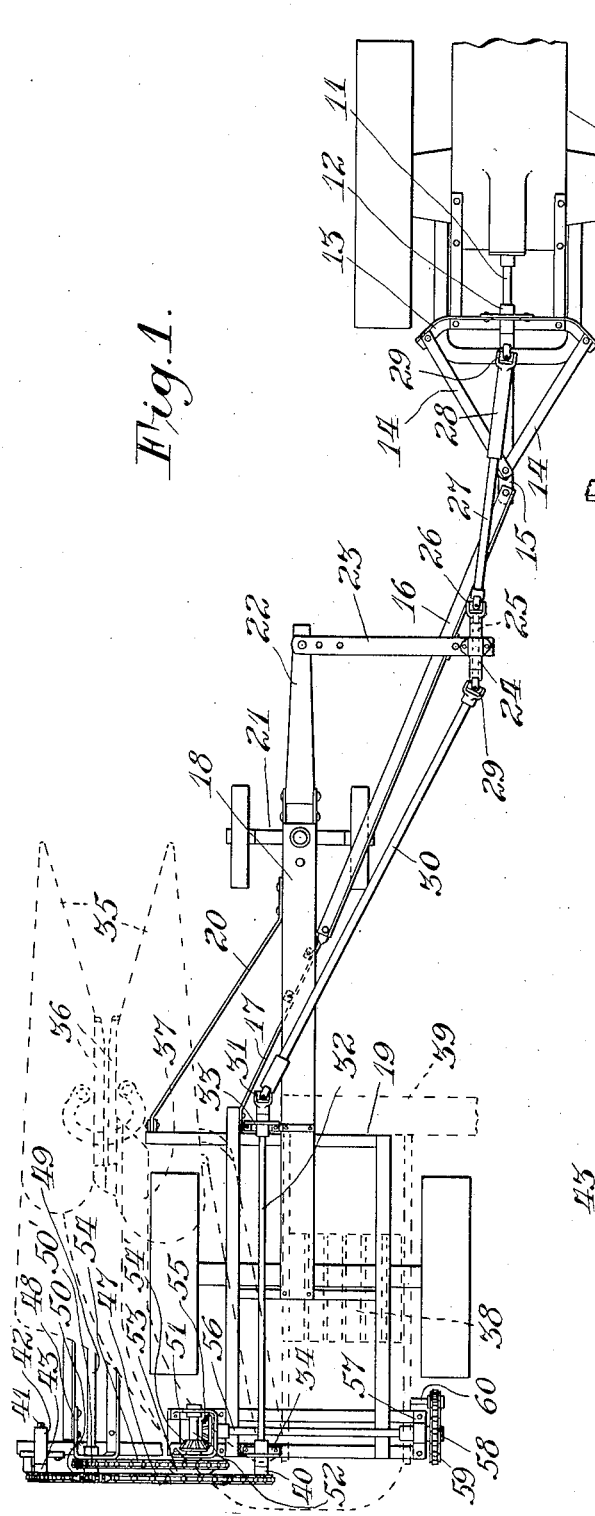

1,646,455

UNITED STATES PATENT OFFICE.

ANDREW L. JOHNSON AND ROBERT M. MITCHELL, OF CHICAGO, ILLINOIS, ASSIGNORS TO INTERNATIONAL HARVESTER COMPANY, OF CHICAGO, ILLINOIS, A CORPORATION OF NEW JERSEY.

POWER DRIVE FOR HARVESTERS.

Application filed August 5, 1925. Serial No. 48,236.

This invention relates to corn harvesting machinery and particularly to an improved driving mechanism for a corn picking and husking machine, commonly known in the art as a corn picker. The growing practice of utilizing tractors in farming operations in place of draft animals now makes it possible and practicable to do away with the heretofore necessary ground wheel or bull wheel drive for harvesting machinery. Some of the tractors now employed on farms are provided with a so-called power take off shaft, such tractors therefore being of use for the purpose of not only pulling the attached harvester but also providing the motive power for driving the operative mechanisms thereof. There is a great advantage in operating harvesting machinery by means of these power take off arrangements in view of the fact that the power delivered is always uniform and entirely independent of the tractive effort exerted by ground wheels, which in practice do not deliver uniform power due to varying ground conditions causing wheel slippage.

It is an object of this invention to provide an improved corn picker adapted to be pulled and driven by a tractor.

It is another object to provide a novel driving mechanism on the corn picker for driving, by means of power derived from a tractor, the operative mechanisms of the corn picker.

Still another object is to provide an improved power take off shaft connection leading from the tractor to the attached harvester.

Other objects will be apparent to anyone skilled in this art as the description hereof progresses.

These objects are accomplished by the improved mechanism hereinafter disclosed, the preferred embodiment thereof being illustrated in the accompanying sheet of drawings, in which like characters of reference are used to designate similar parts and wherein,—

Fig. 1 is a plan view of a tractor and a harvester showing the power connections therefor; and Fig. 2 is a rear elevation of the harvester on an enlarged scale showing the improved driving mechanism for driving the operative mechanisms on the harvester.

Referring to the drawings, it will be noted that there is shown a tractor 10 having a power take off shaft 11 which protrudes centrally and rearwardly from the tractor and is journaled in a bearing 12 carried on a draft member 13 having rearwardly converging arms 14 connected to a central draft bar 15. Pivoted to the member 15 at its extreme rear end and extending diagonally rearwardly is another draft member 16 which is connected to a brace 17, said brace 17 being connected to a tongue 18 of a harvester having a main frame 19 and to said harvester frame, said tongue 18 being braced to the frame of the harvester by a brace 20. By this arrangement it will be seen that the harvester trails the tractor in off-set relation. The tongue 18 of the harvester pivotally carries a conventional tongue truck 21 having a tongue extension 22, which carries at its extreme forward end a transverse cross piece 23. The end of the cross piece 23, which is free, carries a bearing 24 in which is journaled a longitudinally extending stub shaft 25, the forward end of the stub shaft being connected by means of a universal joint 26 to a square shaft 27 telescoped in a sleeve 28, said sleeve in turn being connected to the power take off shaft 11 by a universal joint 29. The rear end of the stub shaft 25 is connected by means of the universal joint 29 to a rearwardly and diagonally extending shaft 30 connected by a universal joint 31 to a longitudinally extending through-shaft 32 journaled in brackets 33 and 34 on the frame of the harvester.

The harvester in this instance is a corn picker, and functions by means of conventional gathering boards 35 and conventional snapping rollers 36 to snap ears of corn from standing stalks and convey them by means of the conveyer 37, shown in dotted lines and diagrammatically, to the usual husking rollers 38 for further treating the corn to remove the husks from the ears, the husks being conventionally discharged from the machine, and the ears conveyed upwardly by means of a conveyer 39 into a barge drawn along side of the machine. The gathering mechanism comprising the boards 35, roller 36, conveyer 37, rollers 38, and conveyer 39 have all been shown in dotted lines and diagrammatically, as they form no part of the present invention. As stated generally in the objects, however, it was an object to provide an improved driving mechanism for the operative parts of a corn picker, such as the snapping rollers and the husking rollers, and such mechanism will now be described. The rear end of the shaft 32 has keyed thereto a sprocket wheel 40. The grainward end of the harvester frame has journaled therein a longitudinally extending stub shaft 41 carried in a bracket 42 bolted to the frame. The rear end of this stub shaft is provided with a sprocket wheel 43. The bracket 42 is also provided with a pivoted bell crank lever 44, the lower end of which rotatably carries a sprocket wheel 45 which is an idler, and the other arm of the bell crank is normally urged in a direction by a spring pressed bolt 46 carried on the bracket 42 to swing the arm 44 and sprocket 45 outwardly to serve as a yielding chain tightener for an endless chain 47 trained around the sprocket wheels 40, 43 and 45. Arranged adjacent the stub shaft 41 in a direction toward the shaft 32, the frame member of the harvester carries a bracket 48 in which is journaled a longitudinally extending shaft 49 arranged in parallel with the shaft 32, said shaft carrying at its rearward end a sprocket wheel 50 which engages the chain 47 to form a bight therein midway between the stub shaft 41 and the main through drive shaft 32. The shaft 49 is also provided with a sprocket wheel 50' for a purpose presently to appear. The frame of the harvester also carries at its rear end a bracket 51 in which is journaled a longitudinally extending stub shaft 52 carrying at its rear end a sprocket wheel 53 geared by a chain 54 to the shaft 49 and the sprocket wheel 50'. Said shaft 52 also carries a bevel pinion 54' meshing with a second bevel pinion 55 keyed to a transversely and stubblewardly extending shaft 56, the outer end of which is journaled in a bearing 57 carried on the frame, and the shaft furthermore carrying adjacent this end a sprocket 58, which is connected by means of a chain 59 to a sprocket carried on a shaft 60, which shaft 60 is conventionally geared (not shown) to the husking rollers 38. The shaft 49 is conventionally geared to the snapping rollers 36 for operating the same.

The operation of this mechanism will now be described. The shaft 11 extending from the tractor is driven to impart rotation through the shafting shown to the main through drive shaft 32 of the harvester, this shaft, by means of the chain 47, imparting rotation to the shaft 49, thereby driving the snapping rollers 36 for picking the ears from the standing stalks guided thereinto by the gathering boards 35. The shaft 49 in turn, by means of the sprocket wheel 50' drives the shaft 52 which in turn, through the gearing described, operates the transverse shaft 56, and the sprocket wheel 57, thereby imparting rotation to the husking rollers 38.

The improved shafting connecting the tractor and harvester and the particular manner of mounting the same will permit uniform transmission of the power from the tractor to the harvester when traveling straight away as well as when turning corners.

It should, of course, be understood that there has been herein shown and described only the preferred embodiment of this invention and that the same is, of course, susceptible of changes in construction and arrangement without departing from the spirit and scope of this invention as hereinafter claimed.

What is claimed is:

1. The combination of a tractor having a power shaft, with a harvester having gathering mechanism and treating mechanism, said harvester being drawn by the tractor, the harvester having a through-shaft driven by the tractor power shaft, a second shaft parallel to the first shaft and driven therefrom to operate the gathering mechanism, a transversely arranged shaft geared to the second shaft, and means operated by said transverse shaft for operating the treating mechanism.

2. The combination in a corn picker having a frame, snapping rolls and husking rolls carried on the frame, of a longitudinal shaft extending through the frame and adapted to be driven by power derived from a tractor, a second shaft on the frame adapted to drive the snapping rolls and spaced in parallel from the first shaft and geared thereto, and a transverse shaft geared to said second shaft adapted to drive the husking rolls.

3. The combination in a corn picker having a frame, snapping rolls and husking rolls carried on the frame, of a longitudinal shaft extending through the frame, and adapted to be driven by power derived from a tractor, a sprocket wheel at the rear end of said shaft, a second longitudinal shaft carried on the frame for driving the snapping rolls, said second shaft having a sprocket wheel at its rear end connected by a chain to be driven from the sprocket wheel on the first shaft, a stub shaft carrying a sprocket wheel driven from the chain connecting the other two shafts, a transversely disposed shaft geared to be driven from the stub shaft, and means operable by said transverse shaft for driving the husking rolls.

4. The combination in a corn picker having a frame, snapping rolls and husking rolls carried on the frame, of a longitudinal shaft extending through the frame, and adapted to be driven by power derived from a tractor, a sprocket wheel at the rear end of said shaft, a stub shaft carrying a sprocket wheel journaled at one side of the frame, a chain connecting the said sprocket wheels on the through-shaft and stub shaft, a second shaft for driving the snapping rolls, said second shaft provided with a sprocket wheel arranged intermediately of the through-shaft and stub shaft and engaging the chain connecting said shafts to be driven thereby, a second stub shaft having a sprocket wheel and journaled in the frame, a chain connecting this second stub shaft to be driven from the second shaft, a transverse shaft geared to the second stub shaft and driven therefrom, and means operable by said transverse shaft for driving the husking rolls.

5. The combination of a harvester having operative mechanism including a shaft to be driven and a tongue truck for supporting the harvester and for steering the same, a cross piece mounted on the tongue truck, with a tractor having a power shaft, draft connections from the tractor coupled to the tongue truck and harvester, a stub shaft journaled on the cross piece, and universal driving connections from the tractor power shaft to the stub shaft and from the stub shaft to the harvester shaft for driving the operative mechanism of the harvester.

6. The combination of a harvester having operative mechanism including a shaft to be driven and a tongue truck for supporting the harvester and for steering the same, a cross piece mounted on the tongue truck, with a tractor having a power shaft, draft connections from the tractor coupled to the tongue truck and harvester, a stub shaft journaled on the cross piece, a telescoping universal driving connection from the tractor power shaft to the stub shaft, and a universal driving connection from the stub shaft to the harvester shaft for driving the operative mechanism of the harvester.

7. The combination of a harvester having operative mechanism including a shaft to be driven, with a tractor for pulling the harvester, the harvester being arranged in trailing off-set relation with respect to the tractor, a tongue truck and draft connections including a bar carried by the tongue truck between the harvester and tractor, a power take-off shaft extending rearwardly and centrally from the tractor, a stub shaft journaled on the bar, and diagonally disposed universal driving connections from the tractor power take-off shaft to the stub shaft on the bar and from the stub shaft to the driven shaft on the harvester to drive the operative mechanism thereon.

8. The combination with an implement having operative mechanism including a shaft to be driven with a tractor for pulling the implement, the implement being arranged in trailing offset relation with respect to the tractor, draft connections between the implement and the tractor including a diagonally disposed member, a support carried by the draft connections, a power take-off shaft extending rearwardly and centrally from the tractor, a stub shaft journaled on the support, universal driving connections transmitting power from the power take-off shaft to the stub shaft, and other power transmitting connections between the stub shaft and the operative mechanism of the implement.

9. In combination with a tractor having a power take-off, a diagonally arranged draft connection extending rearwardly of the tractor and attached thereto, an implement secured to the tractor by said connection in rearwardly and laterally offset trailing relationship, a support carried by the draft connection, a stub shaft rotatably mounted by the support intermediate the tractor and the implement, power transmitting devices including a telescoping shaft and universal joints connecting the stub shaft with the power take-off, and similar power transmitting devices connecting the stub shaft and the operative mechanism of the implement.

In testimony whereof we affix our signatures.

ANDREW L. JOHNSON.
ROBERT M. MITCHELL.